United States Patent

Meyer et al.

[11] Patent Number: 5,995,446
[45] Date of Patent: Nov. 30, 1999

[54] METHOD OF CONDUCTING DRILLING OPERATIONS USING VERTICAL SEISMIC PROFILES

[75] Inventors: Joerg H. Meyer, Addison; Leslie A. Bennett, Plano, both of Tex.

[73] Assignee: Schlumberger Technology Corporation, Sugar Land, Tex.

[21] Appl. No.: 09/063,772

[22] Filed: Apr. 21, 1998

[51] Int. Cl.[6] .............................. G01V 1/18; G06F 19/00
[52] U.S. Cl. ................... 367/25; 367/57; 367/81; 367/911; 367/35; 367/46; 367/44
[58] Field of Search ............................ 367/25, 72, 73, 367/57, 81, 911, 35, 46, 44

[56] References Cited

U.S. PATENT DOCUMENTS

H1232 9/1993 DiSiena ........................... 367/57
5,850,622 12/1998 Vassiliou et al. ................ 702/17

*Primary Examiner*—Christine K. Oda
*Assistant Examiner*—Anthony Jolly
*Attorney, Agent, or Firm*—Steven L. Christian; MArtin D. Hyden

[57] ABSTRACT

A method is described for providing improved seismic data to a driller to indicate position and spatial extent of a drilling target which may be up to several hundreds of feet ahead of a drill bit. In one embodiment, the method includes the steps of: survey design and data modeling, and definition of a drilling target point and a drilling interruption point; drilling down to a depth at which drilling will be interrupted; interruption of drilling; look-ahead borehole seismic survey (VSP); continuation of drilling; data processing and interpretation; coordinate update for optimum target intersection; and steering of drilling by borehole seismic data interpretation.

16 Claims, 6 Drawing Sheets

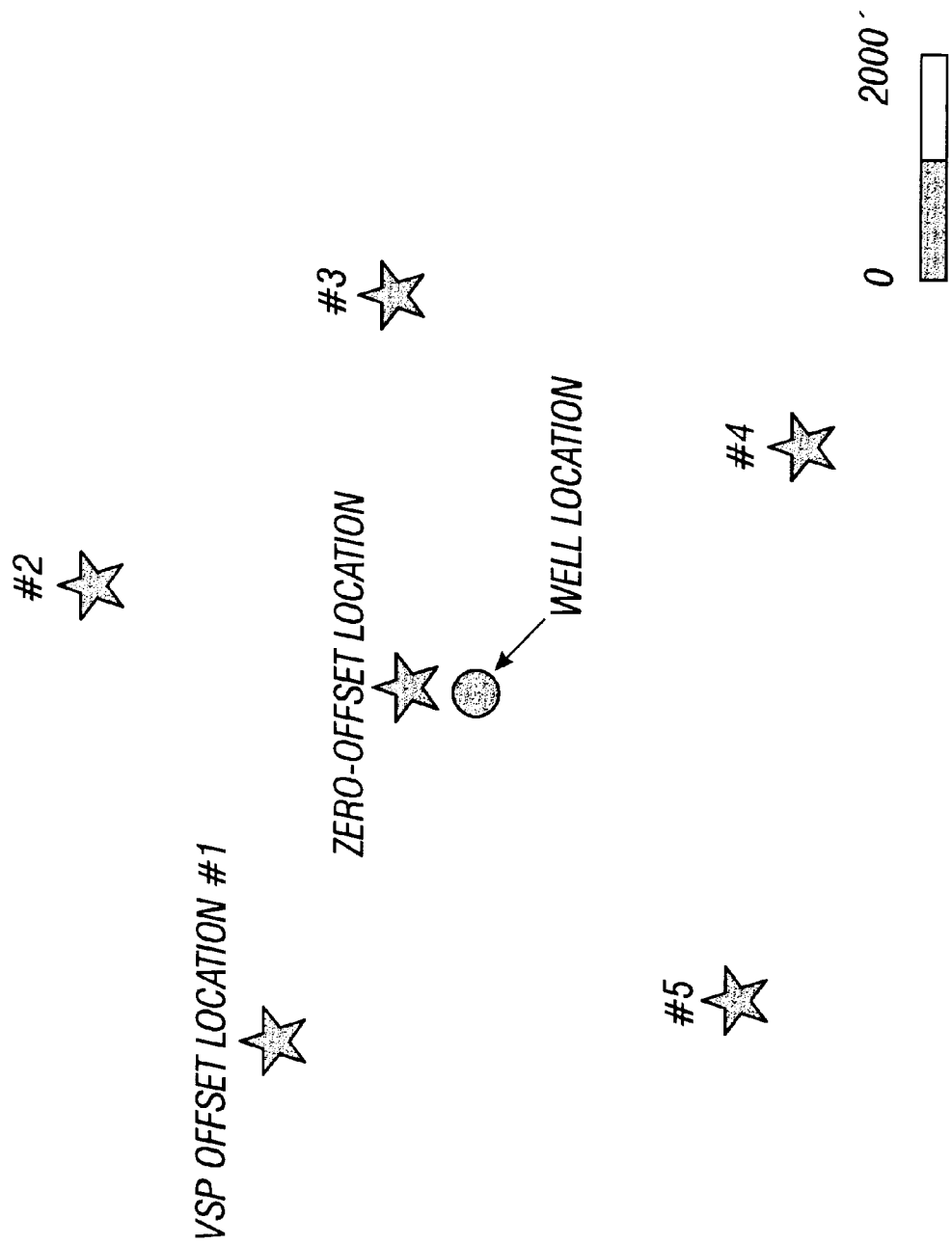

METHOD OF CONDUCTING DRILLING OPERATIONS USING VERTICAL SEISMIC PROFILES

BACKGROUND OF THE INVENTION

1. Field of the Invention

This invention relates to a method of conducting the drilling of a borehole such as is used for hydrocarbon exploration and production. The well trajectory is derived from a look-ahead and look-around borehole seismic survey. Such a survey can provide very valuable information in the case of small drilling targets. This method is applicable also to other applications requiring look-ahead and look-around borehole seismic information.

2. Description of the Related Art

Vertical seismic profiling or "VSP" is a well known technique for obtaining geophysical information around a borehole (Hardage B. A., 1983, Vertical Seismic Profiling, Handbook of Geophysical Exploration, Section I, Geophysical Press, London, Amsterdam.). One or more seismic sources are positioned near the borehole at the surface and a sonde having one or more seismic detectors is lowered into the borehole on a wireline cable. The sonde is then positioned at a number of depths in the well while the sources are activated and seismic readings are taken. Suitable tools for performing such services are Schlumberger's Array Seismic Imager (ASI) or Combinable Seismic Imager (CSI) tools.

Typically VSP surveys are conducted when drilling has reached target depth or at a convenient pause in drilling operations such as an intermediate casing point, and serve to provide a diagnosis of the formations through which the borehole has been drilled.

Pinnacle reefs are high potential gas-bearing reservoirs that can be lucrative drilling targets for the oil and gas industry. They usually have a limited circular size with a diameter that can be as small as 600' to 800'. Their size is very small compared to their distance from the surface that can be greater than 16,000'. Their vertical section can be as thick as 600' which makes them attractive and preferred drilling targets in a Reef Trend. An object of this invention is to provide a technique which assists in steering drilling into a target such as a reef structure.

3D seismic represents a valuable tool to locate prospective reef development. Reef tops generally mark the interface from shale to limestone that creates a high-reflectivity event in the seismic wavefield. Surface and borehole seismic methods can detect and image those reefs that show different patterns of structure and amplitude in seismic data. These two methods have fundamental differences:

First, surface seismic images generally have less resolution than the ones obtained by borehole seismic. VSP sensors are deployed in a borehole that is characterised by a low ambient noise level for better signal recording. Also, seismic waves of a VSP survey generally have to propagate shorter distances and are less attenuated than surface seismic waves.

Second, the precision of accurately mapping the location of a reef structure in space depends on the quality of seismic stacking and migration velocity analysis. For surface seismic data, velocity analysis is based on data acquired at the surface that usually have greater errors with increasing depth. Velocity errors result in a deteriorated surface seismic image. Thus the actual position of a small pinnacle reef can be skewed both vertically and laterally in such an image. Borehole seismic, in turn, calibrates seismic velocity since is measures velocities in a well.

Third, borehole seismic has contributed successfully to the evaluation of thickness and spatial extent of pinnacle reefs by running offset Vertical Seismic Profiles (VSPs). In conventional surveys, geophones are deployed down to the drilling target depth. However, the methods used to date are mainly of diagnostic character. These aim to calibrate images obtained from surface seismic data, to provide depth information of the top and the base of a reef, and to map structural detail within a reef.

The present invention aims to overcome some or all of these problems and limitations in the existing techniques.

SUMMARY OF THE INVENTION

The present invention resides in the steps of determining an optimum point in the drilling process at which a VSP survey can be taken to identify the position of the target, interrupting the drilling at this point and conducting the survey, and further in the use of a 3D model to plan and interpret the results of the VSP survey.

Offset VSP data, unless obtained from a specifically designed 3D VSP survey, are essentially 2D in nature. Even when multiple sources are arranged radially around the well, the data are a collection of 2D surfaces. According to the present invention, a 3D model is used to plan the VSP survey and to interpret the results in a 3D sense. This is required to position correctly and accurately the target of interest in the model and so provide the driller with the necessary information to determine the proper drilling trajectory of the well.

The invention proposes to purposely interrupt the drilling process at a designed optimised point, to conduct a look-ahead VSP survey, and to resume drilling that is directed by the interpretation of the survey.

One goal of this proposed method is to indicate position and spatial extent of a small drilling target up to several hundreds of feet ahead of a drill bit. In one example, the target is a circular reef structure. This approach is essentially predictive in character and includes: survey design and data modeling, and definition of a drilling target point and a drilling interruption point; drilling down to a depth at which drilling will be interrupted; interruption of drilling; look-ahead borehole seismic survey (VSP); continuation of drilling; rush data processing and interpretation; coordinate update for optimum reef intersection; and steering of drilling by borehole seismic data interpretation.

A risk analysis of hitting a small pinnacle reef target reveals a great probability to miss the drilling objective, the consequence of which is to either abandon the well or to sidetrack it. Both possibilities are very expensive and the sidetrack option also contains high operational risk. The present invention aims to provide improved seismic data to help steer drilling into its target the first time.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part of this specification.

It is to be noted however, that the appended drawings illustrate only a typical embodiment of this invention and are therefore not to be considered limiting of its scope, for the invention may admit to other equally effective embodiments.

In the drawings:

FIG. 1 shows a surface seismic line with the major feature of interest labelled and the region having the reef structure shown in enlarged detail;

FIG. 2 shows a 2D subsurface model built from the seismic line data;

FIG. 3 shows a 3D model based on the seismic data and known geophysical information;

FIG. 4A shows a diagram of the prior art approach to using VSP surveys and FIG. 4B shows the differing aspects of the present invention;

FIG. 5 shows a plan view of typical VSP source offsets for the present invention;

FIG. 6 shows the VSP interpretation of the reef structure from the present invention; and FIG. 7 shows a plan view of the well trajectory and VSP interpretation.

DESCRIPTION OF THE PREFERRED EMBODIMENT(S)

Figure 1:
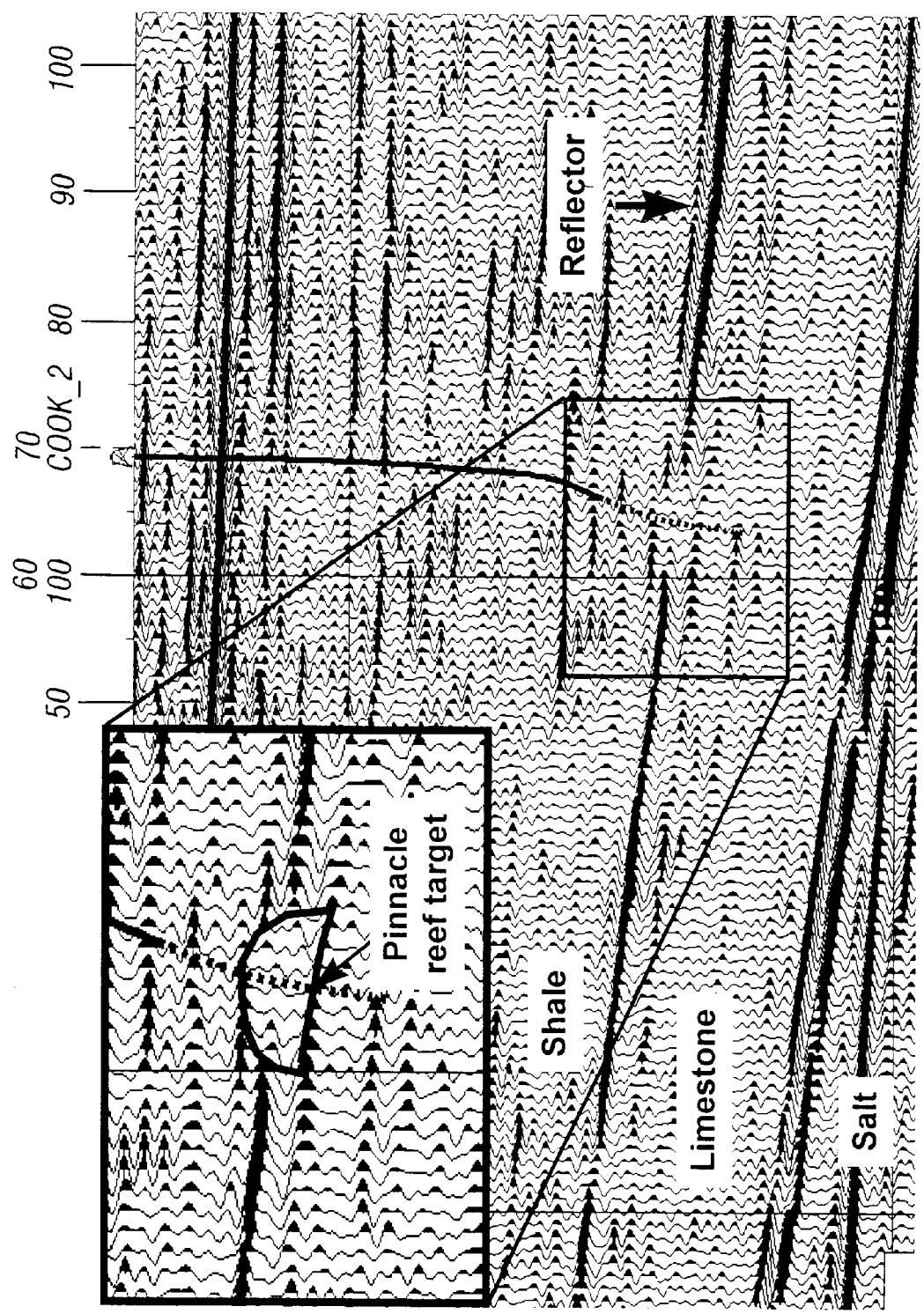

Referring now to the drawings, the preferred method according to the invention comprises the following phases:

1. Planning

First, geophysical data are collected for the region of the proposed well. This data is typically surface seismic data although other data such as borehole seismic data from offset wells might also be available. This data will typically show a target of interest, for example a pinnacle reef, which it is desired to contact with the well (targets which are to be missed by the well can also be shown). Seismic data are shown in FIG. 1 with the pinnacle reef shown in the centre and expanded and highlighted in the box. A seismic line is then interpreted to build a 2D subsurface model (see FIG. 2 which corresponds to the data of FIG. 1 with typical reef dimensions given).

Figure 2:
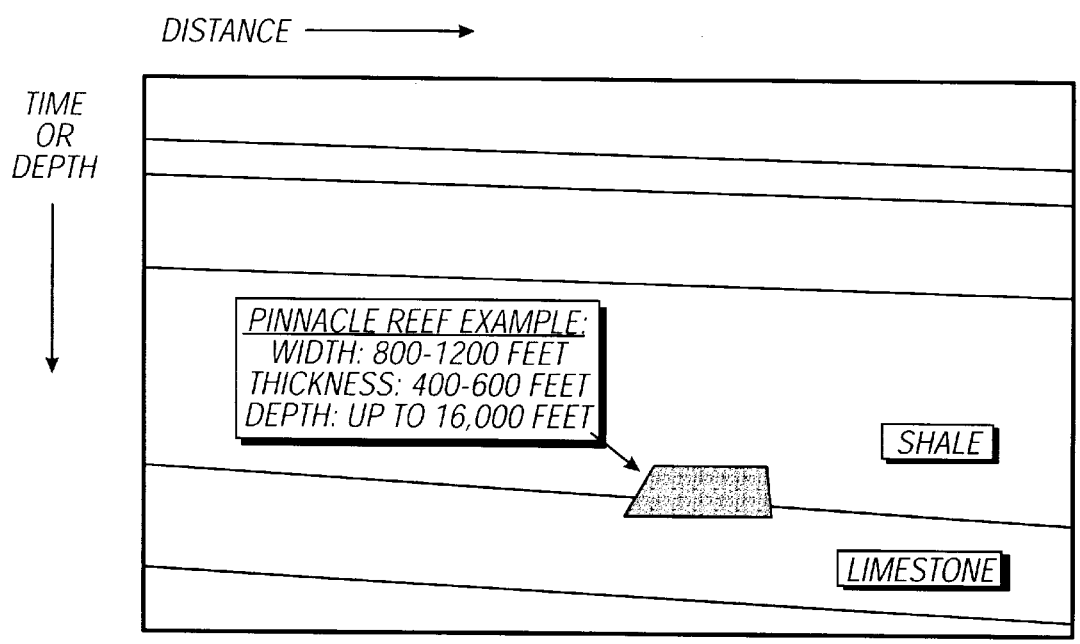
Figure 3:
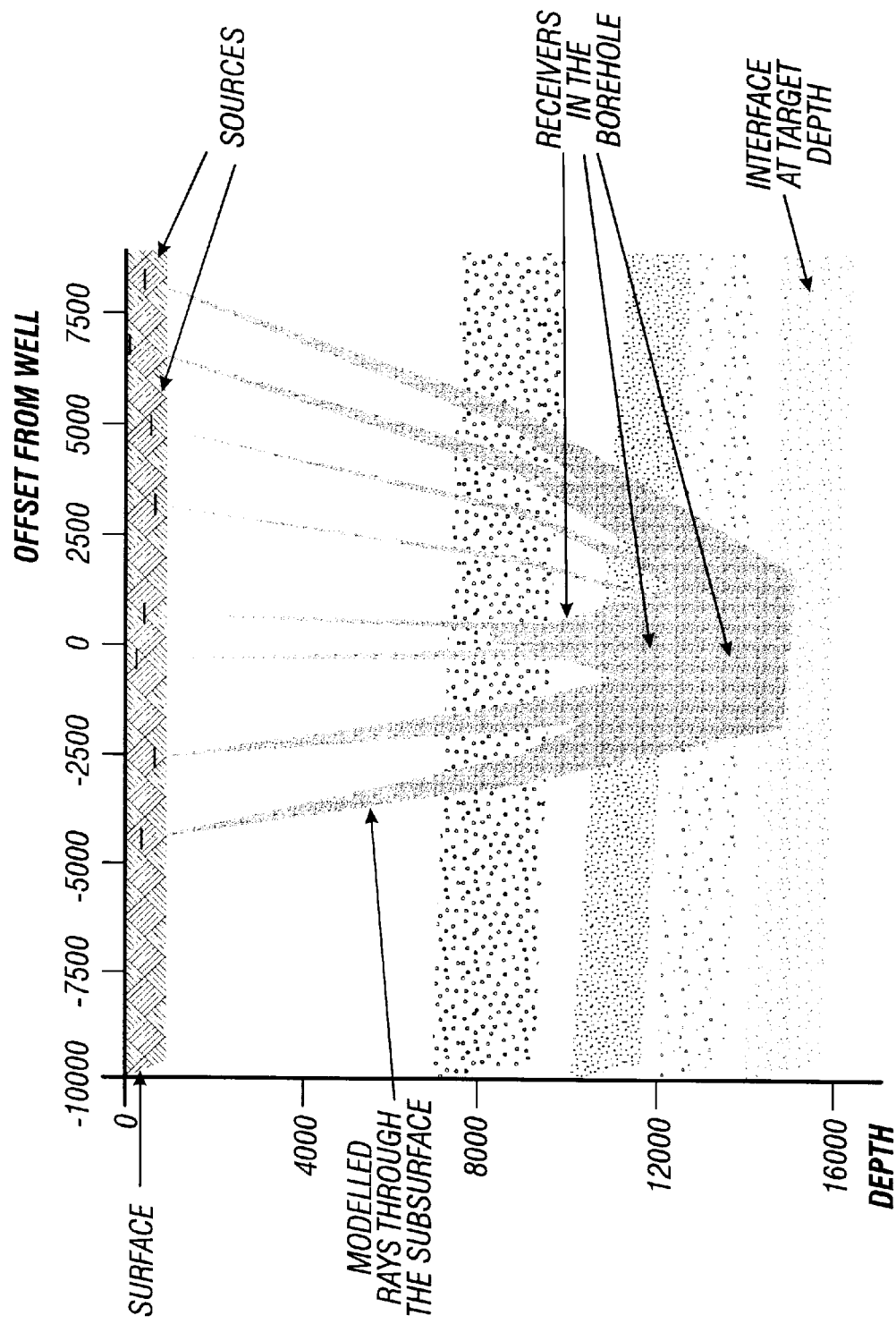

The next step is to build a 3D model which includes the subsurface structure of the formations, dip information, the target of interest and the well trajectory proposed to intersect with the target (or miss it as the case may be) to design the survey and meet its objectives. 3D ray tracing is important to deal with 3D issues such as regional structural dips and/or deviation of the drilled borehole (see FIG. 3 which corresponds to FIG. 2 and shows the surface arrangement of sources for the line, 3D ray tracing, subsurface detail and the position of the receivers in the well, although the receivers and the well are omitted from this diagram for clarity).

A 2D approach to modeling and imaging of a 3D subsurface is only valid in case of no dipping structure. A 3D model can be constructed using commercial geophysical modeling software such as Kudos (Geco-Prakla) or 3D-VSP (GX technology). This model is used to determine the parameters for a VSP survey which is optimised to image the target of interest. Thus the parameters will include: the depth and number of measurement locations in the well, the number of surface sources to be used, and their distribution around the well. For example, not only is the radial position selected, but also the distance from the well and target, so as to allow the target to be imaged despite the influence of subsurface formation dip.

In one particularly preferred embodiment, a lookup table is used to determine the radial distribution of the surface sources and their distance from the well according to factors such as dip, number of sources available, surface topography, and well deviation. The parameters are determined independently of other drilling parameters that might be determined in the planning phase of a well, for example the setting of casing or the running of other formation evaluation services.

The parameters for the VSP survey are optimised for imaging the target. This usually involves a compromise between the interests of obtaining accurate directional information for directing the drilling operation and precise seismic imaging. It is important that the design anticipates possible changes in well trajectory as much as possible. Therefore it is necessary to ensure that the survey point allows correction of the well trajectory within operational capabilities while optimising the accuracy of the image. This is particularly apparent when the target is relatively small, such as a pinnacle reef.

As well as the parameters for the VSP survey, the drilling strategy for the well is planned using this model. Definition of an appropriate drilling strategy involves considering issues for subsurface imaging in the presence of regional dips. It is particularly recommended to keep the well trajectory explicitly on the down-dip side of the structure to be investigated. This helps to overcome limitations of imaging structure on the down-dip side of the borehole.

2. Drilling

Figure 4A:
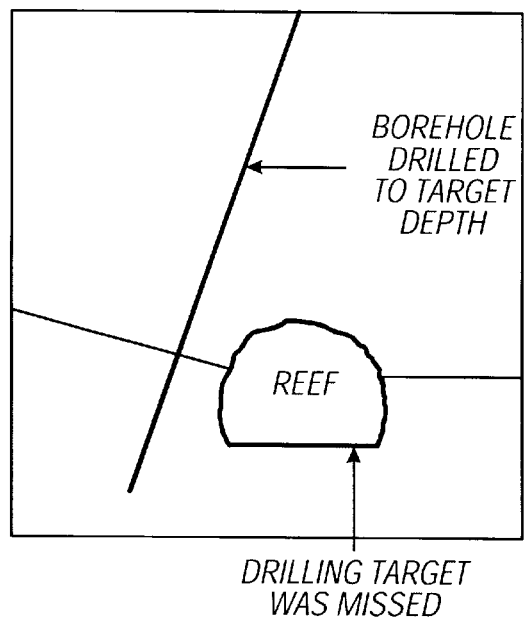
Figure 4B:
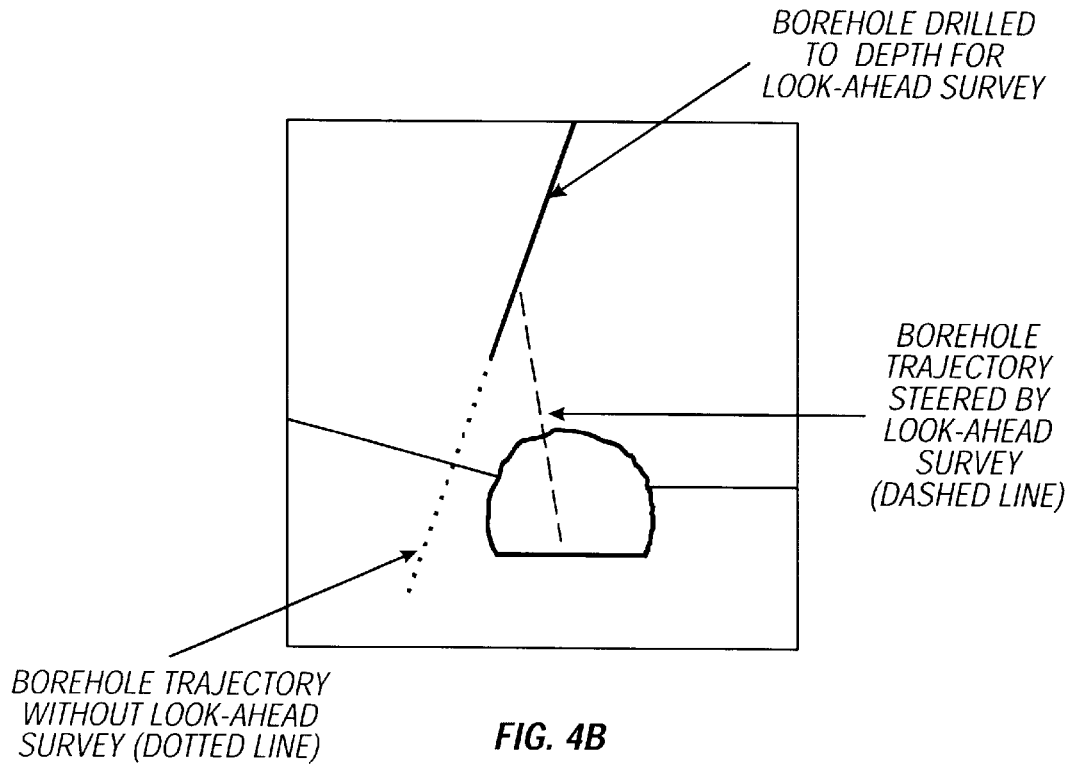

The well is then drilled according to the plan. The drilling at this stage is conducted so as to direct the well towards the target of interest, taking into account known subsurface formation features. For example, drilling might be conducted to take account of the effect of dip which will cause the drill bit to wander, or the drilled trajectory might be followed to avoid subsurface features known to present problems such as incorrect imaging like over-migration. At the predetermined point, drilling is interrupted so that the VSP survey can be run (see FIG. 4B). This is contrary to common practice, in which formation evaluation services are run at convenient breaks in drilling to provide a diagnosis of the formations through which the well has been drilled, or are provided in a "while-drilling" package for real-time (or close to real-time) information. FIG. 4A shows the prior art approach of conducting VSP surveys at TD which merely confirms that the well has missed the reef and does not allow corrective action during the drilling process.

3. VSP Survey

This temporarily interrupts the drilling process and consists of a sequence of multi-azimuth Offset Vertical Seismic Profiles. The survey setup is optimised with sources around the borehole (see FIG. 5 for a typical example). An appropriate source and receiver pattern needs to be designed for each survey and is controlled by the subsurface structure (like velocities and dips), the uncertainty in the actual position of the drilling target, and economical constraints like amount of rig downtime and survey cost. Data are recorded simultaneously from several offset locations in order to minimise acquisition time.

The VSP survey is conducted according to the plan determined earlier. This survey is preferably conducted using a multi-level tool such as the Dual CSI tool of Schlumberger. Other such tools could be used depending upon particular requirements. With regard to the practical matters of performing the VSP data gathering, these aspects are conventional in the VSP art and it is not proposed to describe these in detail here. Once the data is gathered, drilling can resume or other operations can be performed while the data is being processed and analysed.

4. VSP Data Integration and Interpretation

The data obtained in the VSP survey are analysed using the initial 3D model that is updated and refined by including information derived from the VSP survey. This is because while each VSP section is essentially 2D in nature, the 3D effects of the subsurface formation must be taken into account to allow accurate imaging and directional information on the target of interest to be obtained. In order to draw correct conclusions from the VSP survey it is critical to map any interpretation of a VSP image along the corresponding reflection bounce point curve in the 3D model. To this end we need to find for each interpreted point in the 2D VSP image its proper location in the 3D model.

Drilling can be resumed during data processing that handles conventional offset VSPs. Processing results are waveform images like time and depth migrated sections. The borehole seismic sections yield calibrated waveform images at the wellbore that have a higher resolution due to their higher frequency content as compared to surface seismic.

Figure 6:
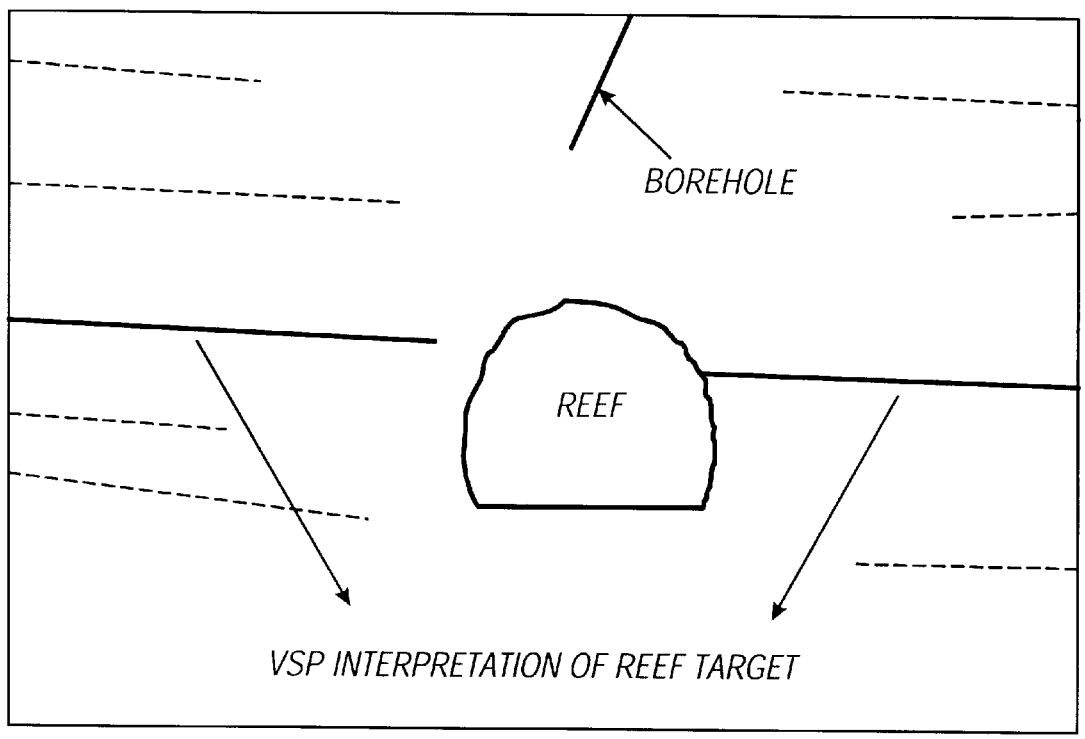
Figure 7:
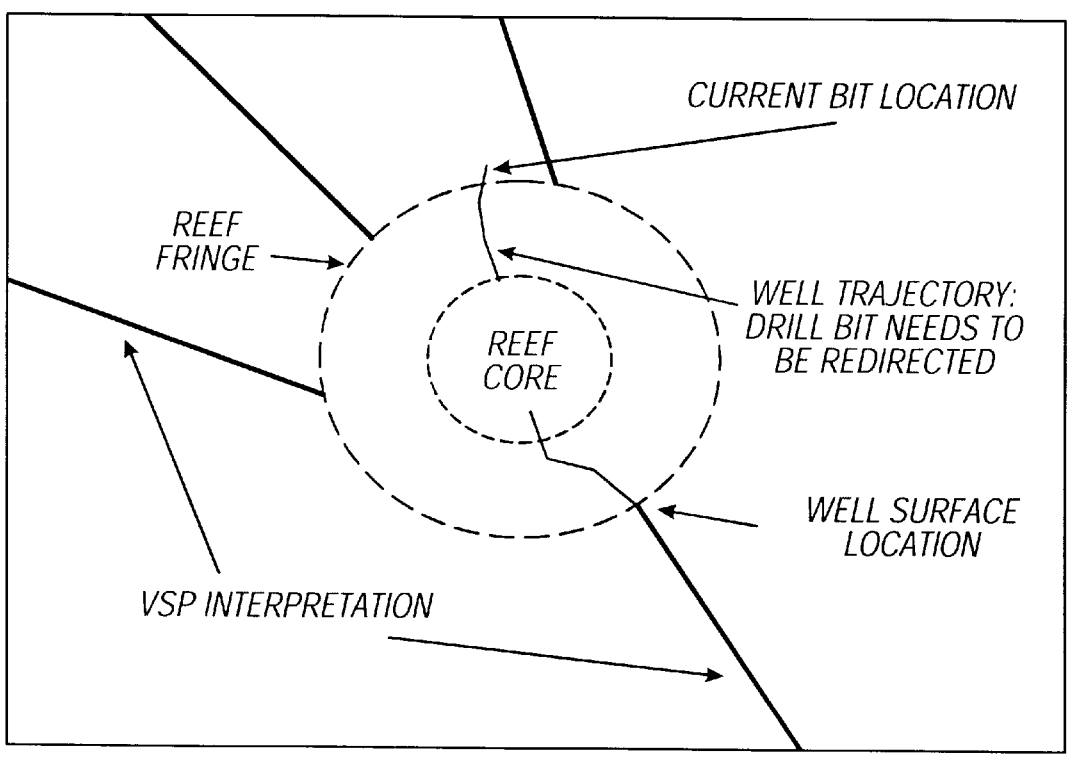

A workstation environment that easily merges both borehole and surface seismic data sets is used to determine the trajectory subsequent drilling. A technique has been developed to integrate the borehole and surface seismic data for the general case of a 3D subsurface and complicated well geometries that can be three dimensional as well. This approach meets the main challenge of seismic data integration of being able to retrieve a corresponding surface seismic profile from a 3D data volume for each VSP image. Such a customised workstation environment allows the transfer of interpretations between borehole and surface seismic images and the comparison of conclusions in either domain in real time. Reef characteristics are interpreted within the borehole seismic data (see FIG. 6) and this interpretation is typically compared with the one of the corresponding surface seismic profiles. Finally, the VSP interpretation is displayed in a map view diagram (see FIG. 7). The VSP interpretation which is positioned along a curve in the 3D model is projected onto the surface. The borehole trajectory is converted from depth to time using the VSP velocities. This allows indication of the reef location with respect to and ahead of the bit location. The final product are spatial coordinates (X and Y) for optimum target intersection.

5. Revised Drilling

The drilling direction is reviewed based on the VSP interpretation. The main result of this operation is to possibly correct before missing the target.

It will be appreciated that certain changes can be made to this technique while still staying within the scope of the present invention. The VSP survey can be supplemented by drill-bit seismic measurements in which the drill bit acts as the seismic source downhole and geophones are arranged at the surface in an array extending from the well. For the purposes of this application, the term "VSP" encompasses drill-bit seismic measurements. Also, the technique can be used to identify and map small targets which are to be avoided during the drilling process, for example shale rafts while drilling salt. Those can represent fatal drilling hazards since circulation of the drilling fluid and the borehole can be lost by drilling into them.

In view of the foregoing it is evident that the present invention is well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive. The scope of the invention is indicated by the claims that follow rather than the foregoing description, and all changes which come within the meaning and range of equivalence of the claims are therefore intended to be embraced therein.

We claim:

1. A method of providing improved seismic information to a driller during the drilling phase of a well regarding the location of a target of interest, the method comprising:
    a) collecting geophysical information for subsurface formations through which the well is to be drilled;
    b) preparing a 3D model based on the geophysical information of the subsurface formations including subsurface structure, the target of interest, dip and a predetermined well plan;
    c) determining parameters of a multi-offset VSP survey for the well based on the 3D model, including arrangement of surface equipment, the depth of the drill bit where the survey is conducted, and number and location of measurements in the proposed well, the parameters being optimized to image the target of interest from several directions;
    d) during the drilling phase, interrupting drilling when the determined optimal depth is reached, the depth defining a VSP point, and performing the VSP survey in accordance with the determined optimized parameters;
    e) processing data acquired from the VSP survey and using the determined optimized parameters to locate the actual 3D positions of the resulting images and their respective alignments; and
    f) identifying the actual position of the target of interest using the actual 3D positions and alignments of the resulting images and determining therefrom a revised trajectory for further drilling.

2. A method as claimed in claim 1, wherein the step of interpreting the results of the VSP survey in accordance with the 3D model includes the step of 3D ray tracing.

3. A method as claimed in claim 1, wherein the VSP survey is a 2D survey.

4. A method as claimed in claim 1, wherein the VSP survey is a 3D survey.

5. A method as claimed in claim 1, wherein the VSP survey is conducted using a number of sources arranged radially around the well.

6. A method as claimed in claim 1, wherein the step of collecting geophysical information comprises collecting seismic data of the subsurface formations.

7. A method as claimed in claim 6, wherein the data is 2D seismic data.

8. A method as claimed in claim 7, wherein the 2D seismic data is used to construct the 3D model.

9. A method as claimed in claim 3, comprising interpreting each data point of the 2D VSP survey as a 2D image and converting each interpreted data point of the 2D VSP image to its correct location within the 3D model.

10. A method as claimed in claim 1, further comprising projecting data interpreted in accordance with the 3D model onto the surface in order to evaluate whether any changes to the drilling trajectory are required to intersect the target of interest.

11. A method of drilling a well through formations having strong regional dips to a target of interest, the method comprising:
    a) determining a well trajectory to remain on a down dip side of the formations with respect to the target of interest;
    b) collecting geophysical information for subsurface formations through which the well is to be drilled;
    c) preparing a 3D model based on the geophysical information of the subsurface formations including subsurface structure, the target of interest, dip and a predetermined well plan;

d) determining parameters of a VSP survey for the well based on the 3D model, including arrangement of surface equipment the depth of the drill bit where the survey is conducted, and number and location or measurements in the proposed well, the parameters being optimized to image the target of interest from several directions;

e) drilling the well in accordance with the determined trajectory;

g) interrupting drilling when the determined optimal depth is reached, the depth defining a VSP point, and performing the VSP survey in accordance with the determined optimized parameters;

h) processing data acquired from the VSP survey and using the determined optimized parameters to locate the actual 3D positions of the resulting images and their respective alignments; and i) identifying the actual position of the target of interest using the actual 3D positions and alignments of the resulting images and determining therefrom a revised trajectory for revised trajectory for further drilling.

12. The method of claim 1, further comprising the step of integrating data acquired from the VSP survey into a corresponding surface seismic data volume to confirm the identification of the actual position of the target.

13. The method of claim 1, further comprising the step of validating the processed VSP survey data using the collected geophysical information and the actual well plan to the VSP point prior to the step of identifying the actual position of the target.

14. The method of claim 11, further comprising the step of integrating data acquired from the VSP survey into a corresponding surface seismic data volume to confirm the identification of the actual position of the target.

15. The method of claim 11, further comprising the step of validating the processed VSP survey data using the collected geophysical information and the actual well plan to the VSP point prior to the step of identifying the actual position of the target.

16. The method of claim 11, wherein the step of interpreting the results of the VSP survey comprises the step of mapping the VSP survey points in the 3D model.

* * * * *